United States Patent [19]

van der Lely

[11] Patent Number: 4,648,472
[45] Date of Patent: Mar. 10, 1987

[54] TRACTOR FOR AGRICULTURAL PURPOSES

[76] Inventor: Cornelis van der Lely, 7 Brüschenrain, Zug, Switzerland

[21] Appl. No.: 715,208

[22] Filed: Mar. 25, 1985

Related U.S. Application Data

[63] Continuation of Ser. No. 468,382, Feb. 22, 1983, Pat. No. 4,523,656.

[30] Foreign Application Priority Data

Feb. 19, 1982 [NL] Netherlands .......................... 8200663

[51] Int. Cl.$^4$ ............................................. B60K 17/34
[52] U.S. Cl. ...................................... 180/24; 180/311; 180/900
[58] Field of Search ........................... 180/24, 900, 311

[56] References Cited

U.S. PATENT DOCUMENTS

| | | | |
|---|---|---|---|
| 3,154,164 | 10/1964 | Shaw et al. ........................ | 180/900 |
| 4,207,956 | 6/1980 | McColl ................................ | 180/24 |
| 4,289,214 | 9/1981 | Spence ................................ | 180/900 |
| 4,309,742 | 1/1982 | Holm et al. ........................ | 180/900 |

*Primary Examiner*—John A. Pekar
*Attorney, Agent, or Firm*—Penrose Lucas Albright

[57] ABSTRACT

A tractor for agricultural purposes, particularly for seedbed preparation, which comprises an engine of thirty or more kilowatts' power which turns gears in a steel metal gear box as supported together with the engine box a frame primarily of tubular or hollow beams, the frame having two frame parts which are movable relative to each other about the frame's longitudinal axis. The tractor has eight wheels which support the frame, four on each side. Each frame part has an axle which mounts on each side on common wheel supports two tandem wheels with pneumatic tires mounted thereon. Each wheel is driven directly by its own hydraulic motor controlled from a cabin mounted on the frame. Two trestles, which also function as ballasts, are adapted to be connected to the tractor's three-point lifting device, each trestle having fastening devices adapted for the lifting device on one hand and further hooks adapted for receiving agricultural implements on the other. The tractor's weight is distributed so that each wheel carries approximately the same weight and exerts a ground pressure of not more than about 0.16 kilograms per square centimeter. One of the trestle-ballasts weighs only fifty kilograms whereas the other weighs one thousand kilograms. The purpose of the tractor is to eliminate or at least minimize adverse compaction of the soil in seedbed preparation operations.

13 Claims, 2 Drawing Figures

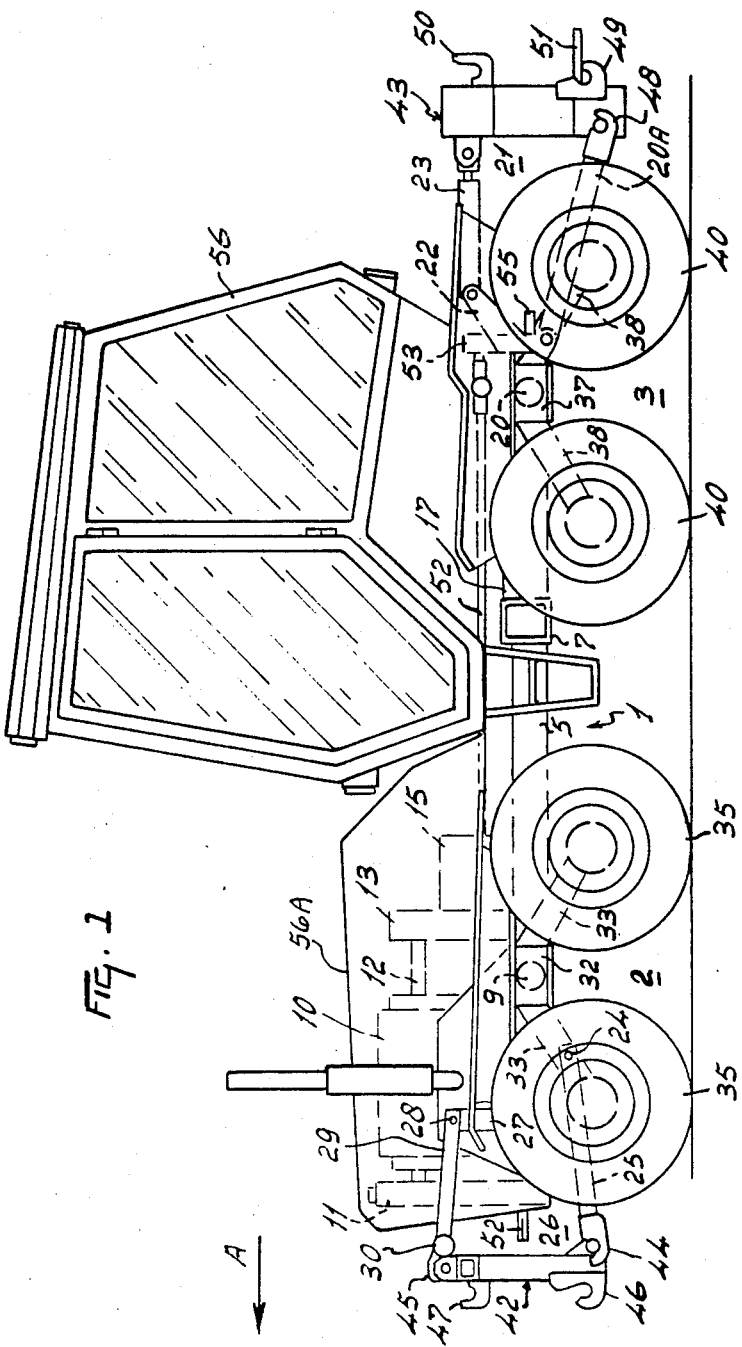

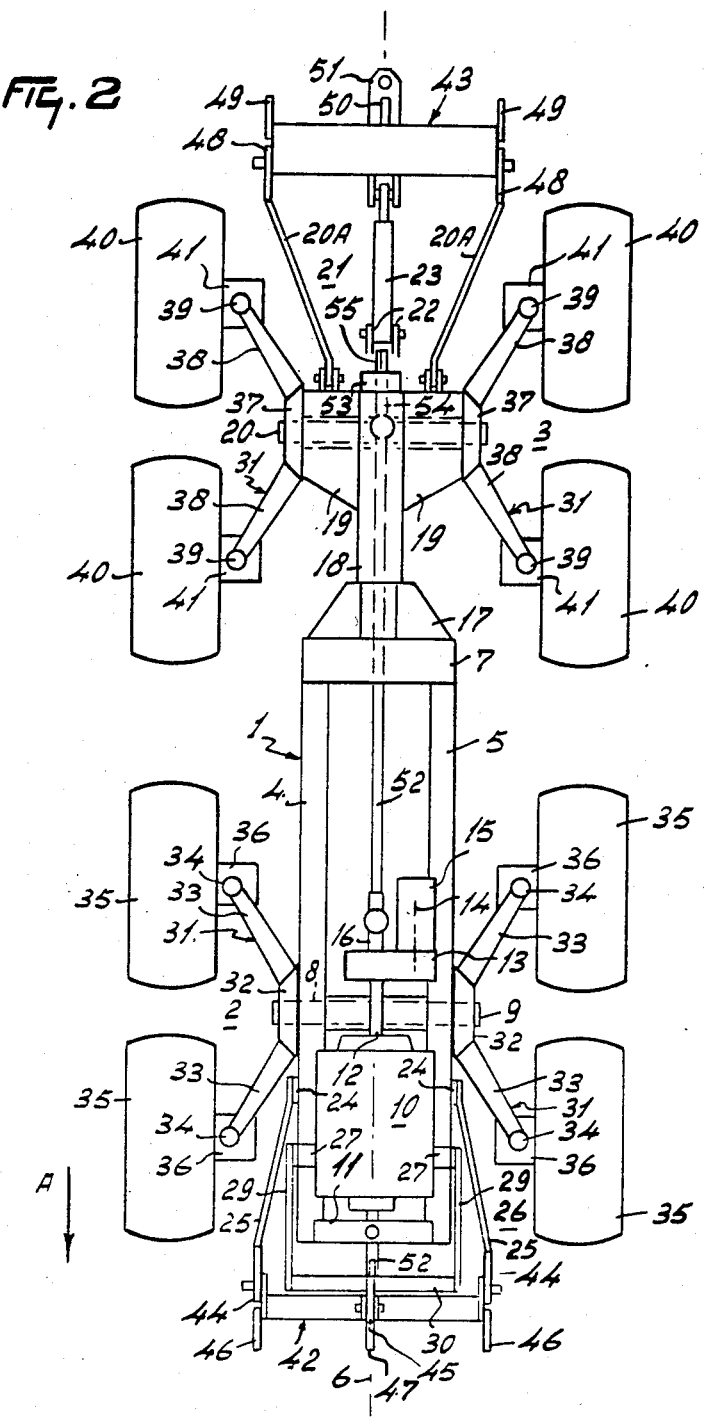

4,648,472

TRACTOR FOR AGRICULTURAL PURPOSES

RELATED APPLICATION

This application is a Continuation Application of application Ser. No. 468,382 filed Feb. 22, 1983, now U.S. Pat. No. 4,523,656.

BACKGROUND OF THE INVENTION

The invention relates to a tractor for agricultural purposes, especially for seedbed preparation, comprising an engine with a power of at least thirty kilowatts, a frame, at least two power driven wheels, at least one lifting device and at least one power take-off shaft.

In the present development of such agricultural tractors there can be observed a tendency in the following directions:
1. ever larger engines,
2. ever larger wheels requiring a heavier power train,
3. ever heavier tractors,
4. more ballast weight per tractor,
5. more use of heavy cast iron as basic parts of the tractor.

It is over looked, however, that increasingly heavier tractors adversely affect the structure and the productivity of the soil.

The heavy tractors are compacting the soil excessively. The drainage of the surface water into the soil will be negatively affected. Hard clods will be formed when the soil dries up. This is resulting in a deterioration of the soil structure, decreasing the productivity.

A further disadvantage of the heavier tractors is that the power required by the tractor for moving itself through the field will become higher. Under average field conditions and especially during seedbed preparation and under soft soil working conditions a tractor will use more than fifty percent of its engine power to move itself through the field. This means that less than fifty percent of the engine power will be available at the power take-off shaft. The need for more power requires a larger engine. A heavier engine however increases the tractor weight, which again requires an increase in engine power causing a vicious circle. Therefore the present thinking how to design a tractor is going in the wrong direction. In addition to this consumption of expensive fuel is becoming excessive.

SUMMARY OF THE INVENTION

It is an object of the invention to avoid these disadvantages. According to the present invention there is provided a tractor as described in the first paragraph, whereby the weight of the tractor is about forty kilograms per kilowatt engine power, the engine power is directly transferable to the power take-off shaft of the tractor and the lifting device has a lifting power at its coupling points of at least one thousand kilograms.

A tractor according to the invention has the advantage of sufficient power to drive through its power take-off shaft a large soil tillage machine connected to the lifting device of the tractor. The tractor therefore does not need much traction power and can have a low weight so that the tractor will not compact the soil during seedbed preparation. The consumption of fuel will decrease and the productivity of the soil will increase. The manufacturing costs of a tractor might be less as the weight of the tractor will be low.

According to another aspect of the invention such tractor has a weight of about two thousand kilograms, the power of the engine is about sixty kilowatts and the length of the tractor measured from the coupling points of its lifting device until the other end of the tractor is about five meters.

Such a tractor has the special advantage that it can be of very low weight and still master a very large power driven machine at its lifting device having sufficient power to lift and to drive such a machine.

BRIEF DESCRIPTION OF THE DRAWING

For a better understanding of the invention and in order to show how the same may be carried into effect, reference will be made by way of example to the accompanying drawings, in which FIG. 1 shows the invention in side elevation; and
FIG. 2 is a plan view of the tractor of FIG. 1 with, however, the engine cover and cabin removed.

DESCRIPTION OF THE PREFERRED EMBODIMENT

The tractor shown in the Figures comprises a frame 1 having a front frame part 2 and a rear frame part 3, which are turnable about a longitudinal axis with respect to each other. The front frame part 2 is made of hollow, tubular beams having plate-shaped walls of steel or light metal. The front frame part 2 comprises two substantially horizontal, hollow beams 4 and 5 located at equal distances from the vertical plane of symmetry 6 of the tractor. The hollow beams 4 and 5 are rigidly interconnected at the front, viewed with respect to the direction of movement A, by means of a horizontal hollow beam (not shown) and at their rear ends also by means of a substantially horizontal hollow beam 7 extending transversely of the direction of movement. Near the engine 10 the beams 4 and 5 are provided with bearings 8 intended to hold a tandem axle 9, which is substantially horizontal and extends transversely to the direction of movement A. On the hollow beams 4 and 5 an engine is mounted, preferably a Diesel engine, said engine being located in front of the main axle 9. At the front side of the engine 10 a cooling system 11 is mounted approximately above the beam between the hollow beams 4 and 5.

On the rear side the engine 10 has an output shaft 12 which extends, viewed in plan, over and across the main wheel axle 9 and is connected at the rear end with an input shaft of a gear box 13 being made of steel metal. The output shaft 14 is connected at its rear end with the input shaft of a variable hydraulic pump 15. The output shaft 14 is located, as viewed in plan, parallel to and at a distance from the center line of the output shaft 12 of the engine 10. The gear box 13 has a second output shaft 16 which is located, in side view, below the output shaft 14.

The front frame part 2 comprises a bearing 17 (FIG. 2), which is rigidly secured to the rear side of the beam 7. The bearing 17 has a center line located in the vertical plane of symmetry 6 of the tractor in a substantially horizontal position. This bearing may comprise a bearing bushing and/or ball or roller bearings. The front end of a hollow beam 18 is pivotable in the bearing 17.

The hollow beam 18 being part of a frame part 3 is provided with a substantial horizontally extending tandem axle 20, said axle extending transversely to the direction of movement. To the rear side of the supports 19 bearings are arranged for the lower lifting arms 20A of a three-point lifting device 21, said arms also being symmetrical to the plane of symmetry 6. To the hollow beam 18 there are connected rearwardly and upwardly extending ears 22, the free ends of which carry a pivotal shaft for the top lifting arm 23 of the lifting device 21. The center line of the top lifting arm 23 is substantially located in the plane of symmetry 6. When the tractor is on a horizontal surface, the centre lines of the tandem axles 9 and 20 are located in the same, substantially horizontal plane.

On both sides of the hollow beams 4 and 5 of the front frame part 2, and as viewed in plan, approximately near the rear side of the engine 20 pivotal shafts 24 are arranged horizontally and transversely to the direction of movement A. The pivotal shafts 24 carry lower lifting arms 25 of a foremost lifting device 26. The hollow beams 4 and 5 are provided at the sides of the engine 10 with upwardly extending supports 27, said supports having pivotal shafts 28, holding the upper lifting arms 29 extending in a forward direction and being located one on each side of the cooling system 11 of the engine 10. At their front ends the upper lifting arms 29 are interconnected by a horizontal hollow beam 10 to which the upper coupling point 45 of the lifting device 26 is connected.

At the ends of the tandem axle 9 the tandem wheel supports 31 are attached. A central part 32 of each tandem wheel support 31 is freely pivotable about the axle 9 and, viewed in plan, is symmetrical to the centre line of the axle 9. To each of the front and rear parts of the central part 32 is rigidly secured a wheel support 33. Each wheel support 33 is outwardly and downwardly inclined away from the central part 32 and its free end is provided with an upwardly directed axis about which a tractor wheel 35 is steerable. Each of the assemblies located one on each side of the front frame part 2 and comprising the central part 32, the two wheel supports 33, the pivotal shafts 34 and the two ground wheels 35 constitutes a tandem wheel set. Each ground wheel 35 can be driven by means of a hydraulic motor 36. The motors 36 are fed by the variable pump 15 driven by the engine 10. The center line of the hydraulic motors is about in line with the axle of a wheel. The two tandem wheel sets 32 to 36 located each on one side of the frame part 2 are pivotable about the main wheel axle 9 independent of one another.

In about the same manner tandem wheel sets are mounted to the rear frame part 3. On each side of the vertical plane of symmetry 6 a central part 37 is pivotable about the tandem axle 20 and is provided with wheel suports 38, which extend, viewed in plan, outwardly and downwardly with respect to the center line of the tandem axle 20. At their free ends they carry substantially vertical pivotal shaft 39, about the axis of which a tractor wheel 40 is pivotable. Each wheel 40 is steerable and can be driven by means of a hydraulic motor 41, which is fed by the pump 15. The planes of symmetry of the wheels 35 and 40 located on one side of the tractor frame are coplanar and the four tandem wheel sets are about identical of design. The diameters of all tractor wheels 35 and 40 are about the same, at least in this embodiment.

In the arrangement shown the foremost lifting device 26 and the rearmost lifting device 21 are each provided with a trestle or hitching member 42 and 43, respectively, the hitching member 43 being of heavy weight and the hitching member 42 having a usual weight. These hitching members may, as an alternative, be arranged in the inverse order, i.e. hitching member 42 on the rearmost lifting device 21 and htiching member 43 on the foremost lifting device 26 or either can be used on both lifting devices. Moreover, only one of the two hitching members 42 or 43 may be fastened to the foremost or to the rearmost lifting device and, as a further alternative, the two hitching members may not be fastened to the tractor at all, depending on the jobs to be carried out. If compaction of the soil structure could occur it is preferred to omit both hitching members and implements can be directly hitched to the lifting devices 21 or 26. If there is a danger of excessive wheel slippage it is preferred to attach the hitching member 43 to the foremost or the rearmost lifting device or to provide the two lifting devices with a heavy hitching member 43 each. The coupling points of the two lifting devices are of the same design and have the same relative distances.

Viewed in the direction of movement A the hitching member 42 has the shape of an inverted U and is made of tubular material of light weight (weight about fifty kilograms). On its side facing the tractor and at both lower ends, the hitching member 42 has pinshaped coupling points for attaching the hitching member to the two lower lifting arms 25 of the lifting device of the tractor, said arms having for this purpose hooks 44 opening up in upward direction. In the plane of symmetry of the hitching member 42 and on the top side thereof, a pin extends horizontally and transversely to the direction of movement, about which pin can grasp a hook 45 being pivotally connected to the beam 30 of the upper arms of the lifting device 26, midway the length of said beam. On its side remote from the tractor the hitching member 42 is provided with two hooks 46 opening in upward direction, each of which is arranged near a lower end of the U-shaped hitching member 42, while midway the length of the horizontal tube of the U-shaped hitching member 42 there is fastened a hook 47 opening in upward direction, which is located in the plane of symmetry 6, when the coupling member is attached to the tractor. The hooks 44 constitute the coupling points of the lifting device 26.

Viewed in the direction of movement the hitching member 43 has a rectangular shape, the sides of which are formed by solid steel bars having a cross-section of about twenty by thirty centimeters. The weight of the hitching member 43 is preferably about one thousand kilograms. Near its outer and lower ends the hitching member 43 is provided with laterally protruding pins adapted to connect in the hooks 48 opening up in upward direction and arranged at the free ends of the lower lifting arms 20A of the lifting device 21. The hooks 48 constitute the coupling points of the lifting device 21. Midway the length of an upper, horizontal bar of the hitching member 43 ears are provided supporting a horizontal pin extending transversely of the direction of movement for connecting to the end of the upper lifting arm of the lifting device. On the side remote from the tractor and at the outer and lower parts the hitching member 43 is provided with hooks 49 which on their undersides open up in upward direction and located at a distance from and symmetrically to the plane of symmetry when the hitching member 43 is fastened to the tractor. Midway the length of the horizontal upper beam of the hitching member 43 a rearwardly extending hook is arranged which is also oepn from the bottom in upwardly direction. By means of the hooks 46 and 47 of the hitching member 42 and the hooks 49 and 50 of the hitching member 43, which constitute three-point coupling systems, implements can be hitched to the hitching members 42 or 43 respectively at the front or at the rear of the tractor or both. Midway the length of a horizontal lower bar of the hitching member 43 a draw hook 51 is provided for pulling wagons or implements.

The second output shaft 16 of the gear box 13, which is located, as viewed in plan, below the output shaft of the engine 10 is connected with a forwardly directed shaft, extending out of the frame at the front of the tractor to form a power take-off shaft 52 for driving implements hitched to the foremost lifting device 26. Furthermore, the output shaft 16 of the gear box 13 extends to the rear and forms an intermediate shaft 52, at the rear side of which, a gear box 53 of steel metal is mounted, said gear box being connected to the rear side of the hollow beam 18, and having an input shaft 54, which is located above the hollow beam 18. The intermediate shaft 52 is drivably connected by means of universal coupling with the output shaft 16 of the gear box 13 and with the input shaft 54 of the gear box 53. The gear box 53 has an output shaft 55 located approximately at the level of the hollow beam 18 and serving as a power take-off shaft for driving implements attached to the rear lifting device 21.

The engine 10, the gear box 13 and the hydraulic pump 15 are surrounded by cover 56A, which, viewed from the side, terminates approximately at a vertical plane extending transversely to the direction of movement A comprising the rearmost points of the rearmost wheels 35. Above the rear part of the frame part 2 is mounted the drivers cabin 56 which extends, as viewed from the side, from the rearmost points of the rearmost wheels 35 up to the axle of the rearmost wheels 40. The overall length of the cabin 56, measured in the direction of length of the tractor, is about two meters. This length may be equal to about one half the overall length of the tractor. Since the rear frame part 3 is pivotable with respect to the front frame part 2, the cabin is not connected to the rear frame part 3. The inner height of the cabin 56 above the floor is about 190 cms. The drive in the cabin can see from his seat the coupling points of the lifting device 21 as well as the ground directly adjacent the tractor wheels. The width of the cabin is preferably substantially equal to the track of the tractor being about one hundred, eighty centimeters. The free space underneath the tractor is about sixty centimeters.

In connection with the invention the following additional data are of importance.

The overall weight of the tractor without hitching members 42, 43 is about two thousand kilograms. Preferably the weight of the tractor is forty kilograms per kilowatt engine power. Among others this can be achieved for a major part by using a frame of light weight, hollow beams, hydraulic drive of the wheels, no heavy gearboxes and no large wheels. Therefore a low ground pressure can be obtained. The wheels are equipped with pneumatic tires having a diameter of about one meter and a width of about forty centimeters so that the diameter is about two times or about two and one half times the width of the pneumatic tire. The contact surface of each tire on the ground is about forty by forty centimeters under average ground conditions (ground pressure about 0.16 kilograms per square centimeter). If the tractor would be equipped with four wheels the tractor weight per wheel would be about five hundred kilograms. It is important that the force exerted by a wheel on the ground will have approximately the same value on all tractor wheels. The tractor is equipped with four tandem wheel sets arranged in pair on each side of the tractor, independently about the axle 9 and the axle 20 respectively. The uniformity of the ground pressure between the wheels and the ground is further improved by the rear frame part 3 being pivotable about a horizontal axis extending in the direction of movement A. The distribution of the weight of the tractor over its length also is important. The mounting of the engine, the gear box 13 and the hydraulic pump 15 on the front part of the tractor frame and on the other hand the weight of the cabin 56 on the rear part of the frame contribute to the uniform distribution of the weight on all tractor wheels.

The engine power of the engine 10 is at least thirty kilowatts and is in this embodiment preferably about sixty kilowatts. The diameter of the tractor wheels 35 and 40 is about one meter. The eight wheels can exert sufficient tractive force against the ground and, at the same time the driver's view on the implement is not obstructed. As indicated above, the track of the tractor in this embodiment is about one hundred eighty centimeters. The overall length of the tractor with attached hitching members 42 and 43, i.e. the distance between the coupling hooks 46, 47 and 49, 50 respectively, is about five meters.

The low weight of the tractor results from the use of light hollow frame beams, a light hydraulic drive for driving the tractor wheels and light wheels of a small diameter so they can be mounted on relatively light axles can be applied, this is contrary of the cast iron frames and very large wheels on the commercial tractors presently available of similar power. In such tractors the frame usually consists of a cast iron transmission housing connected to the engine and a cast iron rear axle connected to the cast iron transmission housing. The axles of wheels are of a very large diameter as these axles must drive large and slowly revolving tractor wheels.

The tractor embodying the invention has a low relative weight and this tractor can, if desired, be provided with one or two hitching members of the type described for the hitching member 43, e.g. when the tractor has to pull a heavy wagon or a heavy pull type implement not being power driven. For pulling wagons or implements the hitching member 43 is provided with the drawhook 51.

For carrying out seedbed preparation with power driven implements (when the weight of the tractor has to be as low as possible) the heavy hitching member 43 is not used.

The lifting capacity of the tractor is about four thousand kilograms and the lifting power of the rearmost lifting device is about three thousand kilograms or more.

The lifting devices of the tractor are designed in such a way that they will be capable of connecting hitching members 42 and 43 (or an implement) picking them up from the ground without further assistance. The coupling points are normally about twelve centimeters above the ground.

Owing to the length of the tractor, if the weight of the front part 2 of the tractor is only about one thousand kilograms, the lifting power at the coupling points on the rear lifting device 21 is about five thousand kilograms. The length of the tractor therefore permits the tractor to lift large power driven implements without compacting the soil as the weight of the tractor is in comparison with the usual tractors low.

As the tractor wheels are relatively small and as the coupling points of the lifting device are, viewed from the side, as usual directly behind the wheels, the tractor has a higher lifting power than usual.

The tractor according to the invention is especially suitable for seedbed preparation; however, it can be used for other farm operations in which low ground pressure and high engine power is of advantage. Important advantages of the tractor are in its high power at the power take-off shafts, the low ground pressure exerted by the tractor wheels and its excellent lifting capacity.

Preferably the tractor is provided with hydraulic motors for driving the tractor wheels. In such case the engine of the tractor can be used to its maximum extent for driving the power driven implements. With the wheels hydraulic drives being continuously variable, the forward speed of the tractor can easily be adjusted, giving maximum operating efficiency.

Preferably the tractor has a three-point lifting device with a lifting power at its coupling points of about one and one half times the weight of the tractor.

The invention not only relates to the statements made in the foregoing and the Claims, but also intended to encompass inventive features disclosed in the Figures.

Having disclosed my invention, what I claim as new and to be secured by Letters Patent of the United States is:

1. A lightweight agricultural tractor having a relatively high power-to-weight ratio for seedbed preparation which comprises: an engine having power in a range of about thirty to sixty kilowatts and transmission means powered by said engine, said transmission means comprising at least one steel gear box housing; a frame composed in major part of hollow beams carrying said engine; a lifting device including coupling points connected to one end of said frame, the length of said tractor measured from said coupling points to the other end of said tractor being about five meters; and a set of front wheels and a set of rear wheels which are mounted to and support said frame, wheel supports pivotally attached to said frame and interconnecting said wheels in both said sets to said frame so that all of said wheels are freely pivotable upwardly and downwardly within limits relative to said frame and the portion of the weight of the tractor borne by each said wheel in each said set is about the same, at least one of said sets of said wheels driven by said engine via said transmission means, and at least four of said wheels comprising low pressure pneumatic tires each having diameters of about one meter and widths substantially about forty percent of their respective diameters, and a ground contact surface area of about said width squared so that the weight of the tractor on said contact surface area of each said tire is such that it does not adversely compact the soil when used for seedbed preparation.

2. A tractor in accordance with claim 1 wherein one said set of said wheels is pivotable as a whole with respect to the other said set of said wheels about a horizontal pivot axis disposed in the tractor's vertical plane of symmetry.

3. A tractor in accordance with claim 1 comprising a hydraulic pump driven from said transmission means, a hydraulic motor driven by said hydraulic pump on each said wheel support adjacent each said wheel, whereby each of said four wheels has its own respective hydraulic motor for driving same.

4. A tractor in accordance with claim 1 wherein said wheels in said set driven by said engine are each independently drivable.

5. A tractor in accordance with claim 1 wherein the ratio of the weight of the tractor in kilograms to the power of said engine in kilowatts is about forty to one.

6. A tractor in accordance with claim 1 which weighs about two thousand kilograms.

7. A tractor in accordance with claim 1 wherein said ground pressure is about 0.16 kilograms per square centimeter.

8. A tractor in accordance with claim 1 wherein the power of said engine is about forty kilowatts.

9. A tractor in accordance with claim 1 wherein the tractor's track as defined by said wheels is about one hundred and eighty centimeters.

10. A tractor in accordance with claim 1 wherein the weight of the tractor supported by each wheel is not more than about two hundred and fifty kilograms.

11. A tractor in accordance with claim 1 comprising a cabin supported by said frame, the distribution of said cabin, said engine and said transmission as arranged on said frame being such that said engine and said gear box are supported primarily by one said set of said wheels and the weight of said cabin is supported primarily by the other set of said wheels and the proportion of tractor's weight supported by each of said wheels is about the same.

12. A tractor in accordance with claim 1 comprising at least eight wheels.

13. A tractor in accordance with claim 1 comprising a power take-off shaft which extends from the same end of said frame as said lifting device, said power take-off shaft being adapted to drive implements connected to said lifting device.

* * * * *